United States Patent [19]
Steadman

[11] 4,272,802
[45] Jun. 9, 1981

[54] TOWER LIGHT SYSTEM

[76] Inventor: Rufus P. Steadman, Rte. 2, Box 249, Middleton, Tenn. 38052

[21] Appl. No.: 5,757

[22] Filed: Jan. 23, 1979

[51] Int. Cl.$^3$ .............................................. B60Q 1/06

[52] U.S. Cl. .................................... 362/385; 362/285; 362/403; 362/431

[58] Field of Search ............... 362/385, 382, 403, 431, 362/386, 285, 286, 145, 226

[56] References Cited

U.S. PATENT DOCUMENTS

| | | | |
|---|---|---|---|
| 1,012,457 | 12/1911 | Severson | 362/385 |
| 1,977,105 | 10/1934 | Wood | 362/226 |
| 3,696,241 | 10/1972 | Meyer et al. | 362/403 |
| 3,968,355 | 7/1976 | Smallegan | 362/226 |
| 4,025,782 | 5/1977 | Kaeser | 362/403 |
| 4,115,845 | 9/1978 | Blahut | 362/403 |

*Primary Examiner*—Monroe H. Hayes
*Attorney, Agent, or Firm*—Millen & White

[57] ABSTRACT

An assembly for supporting a light or other signal fixture in an elevated location, either self-supported, as basally, for lighting purposes, or as on TV and radio towers, smoke stacks and other installations requiring elevated operative warning signals, as safety beacon lights or other similar fixtures, at the top portion thereof, and for lowering such fixtures to an accessible inoperative lower location for replacing, repairing or otherwise servicing the fixture without requiring service personnel to climb, to or from the elevated operative location; and including an auxiliary vertical support assembly in association with the tower or like structure and having a carriage associated therewith and carrying a light or other signal fixture, and which carriage may be moved along the support assembly to a lowered, retracted, inoperative position at rest or for replacement or repair of the fixture, and to an upper elevated operative position relative to the tower or like structure, making electrical or other operative connections for the fixture in such operative elevated location relative to the tower.

9 Claims, 4 Drawing Figures

TOWER LIGHT SYSTEM

BACKGROUND OF THE INVENTION

The invention is concerned with high level mounting of beacons, as signal lights or other warning signal fixtures, on TV and radio towers and other stabilized elevated structures requiring such signal fixtures at the top portion thereof. Repair or replacement of such fixtures has presented the problem of danger to service personnel in climbing to and from such elevated locations, such dangers being increased during inclement weather, if not rendering servicing impossible during such conditions. Insurance rates have been high under such conditions as well as the expense of repair at such elevated locations, normally based on a dollar amount per footage. Efforts to alleviate these problems have been made such as the provision of unitized replacement fixtures at pole ends (U.S. Pat. No. 3,679,891); cable and like mechanisms for lowering the fixtures, as flood lights (U.S. Pat. No. 3,686,498; U.S. Pat. No. 3,856,639), and signal lights (U.S. Pat. No. 3,292,322). However, the expenses of such mechanical details must be considered.

SUMMARY OF THE INVENTION

According to the present invention, the assembly includes a light or other signal fixture mounted on a carriage which is movable between an upper signal emitting position relative to the tower or other elevated structure, and a lower position relative to the tower affording ready access to the fixture for repair, replacement or other servicing, either at ground or low support level, thus eliminating the necessity for climbing to dangerous heights for such servicing. Provision is also made for automatic energization of the signal fixture at the upper operative position thereof, and for disconnecting the fixture from its energizing source upon descent thereof to a lower accessible servicing position, thus eliminating danger to servicing personnel, as from electric shock or the like.

An object of the invention is to provide an assembly substantially of the above type wherein the elevating and lowering mechanism for the carriage is substantially free from the effects of weather conditions, such as wind, snow, freezing conditions and the like.

Another object of the invention is to provide such an assembly including a substantially sealed tubing arrangement in supported association along the height of the tower or like structure, and within which tubing arrangement the carriage and included fixture may be elevated to operative position adjacent the top of the tower or like structure by fluid pressure, with permissive release for descent thereof to an accessible servicing position.

A further object of the invention is to provide such an assembly with automatic energization of the fixture at the upper operative position thereof and disconnection of the operation of the fixture upon descent thereof to the lower accessible position.

The above and other objects of the invention will in part be obvious and will be hereinafter more fully pointed out in the description of the drawings in which.

Figure 1:
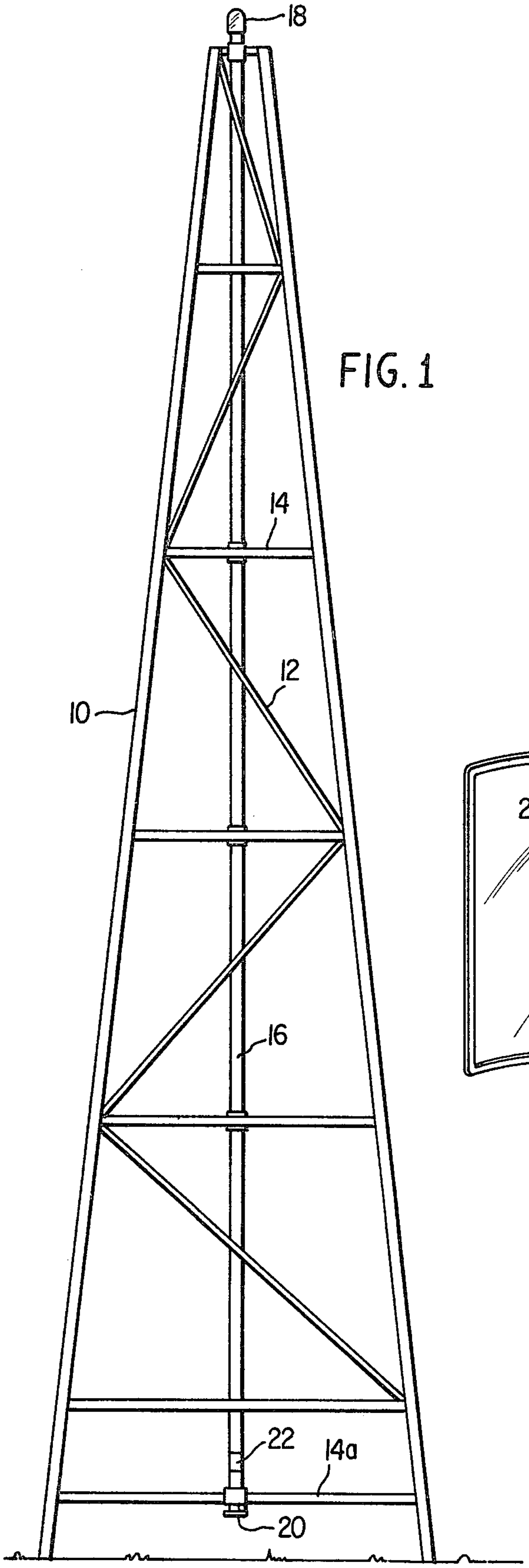
FIG. 1 is an elevational view of a tower structure with the elevator tubing arrangement in association therewith.

With reference to the accompanying drawings, and particularly FIG. 1 at this time, the tower structure may be of suitable stabilized construction and is illustrated as including upstanding inclined support legs 10 of tubular or solid steel, aluminum or similar material and substantially braced and connected by an array of diagonal brace elements 12. In addition, there may be provided horizontal bracing members 14 joining a sealed tube 16 and the legs and bracing elements for stable support along the length of the tower. The top of the tubing arrangement is closed by a glass casing 18 through which the light in its upper position will be visible as a beacon. The lower end of the tubing is closed by a bottom cover 20 and a lower part of the tubing is provided with an access opening sealingly closed by a closure 22. A lower transverse member **14*a* may serve as a support platform at a reasonable and safe height above ground level for servicing the fixture upon opening the closure 22. In this connection, the door 22 is shown opened in FIG. 2 for access to the light bulb 24 or other signal which is supported by the carriage, and is provided with a trim gasket 25** for sealing around the access opening when closed. The opening is sized according to the size of the fixture to be serviced as by operator hand insertion thereinto.

Figure 2:
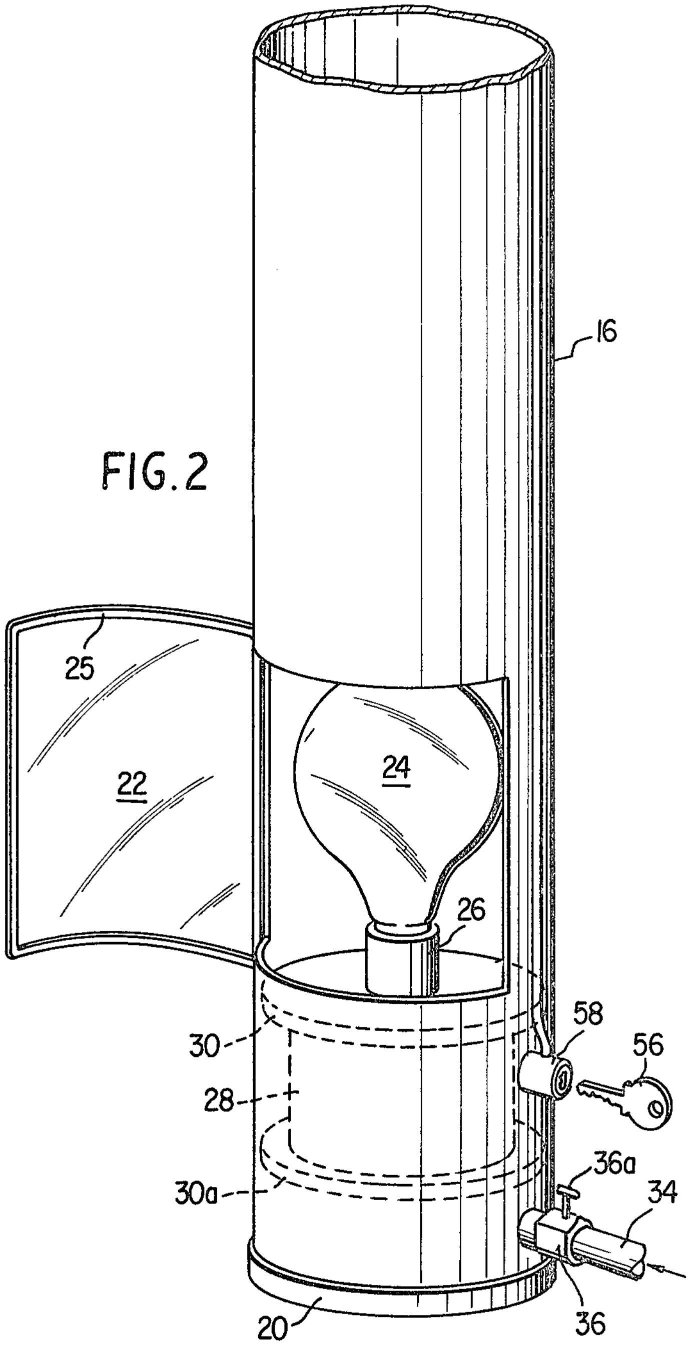
FIG. 2 is an enlarged fragmentary perspective view of the lower portion of the tubing arrangement with the light access opening exposed.
Figure 3:
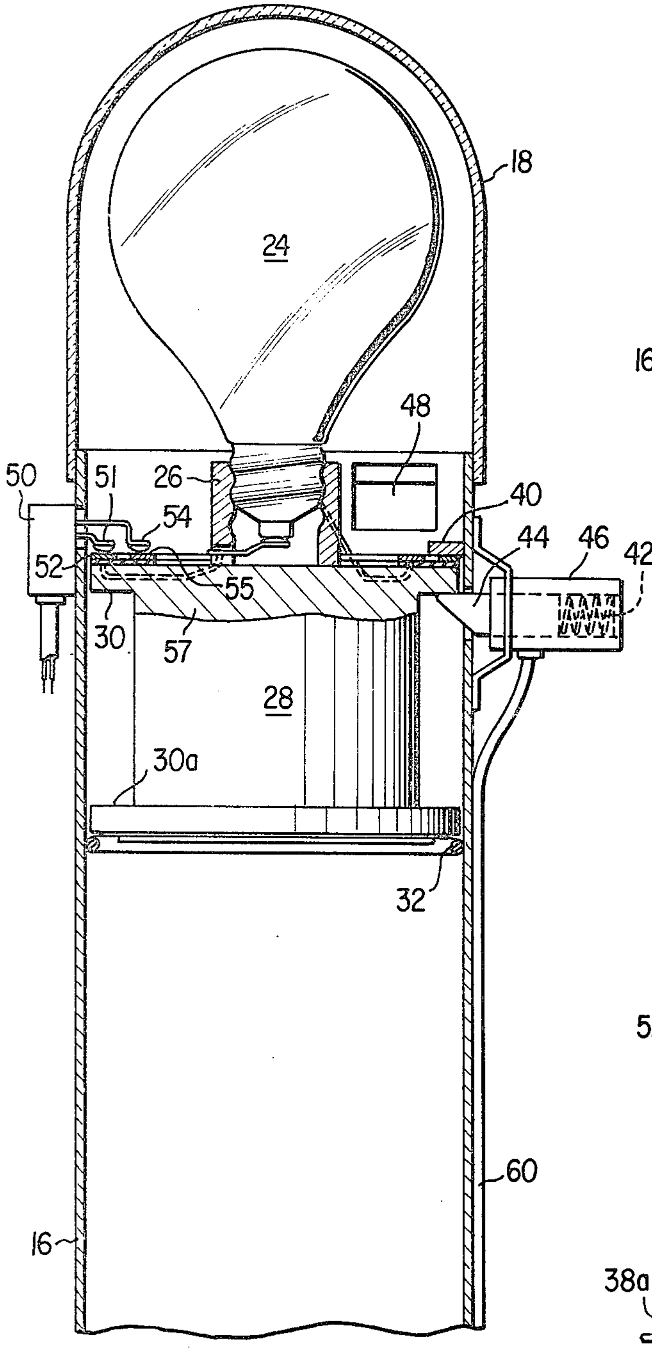
FIG. 3 is a further slightly enlarged section view of the upper portion of the tubing arrangement with the carriage and light fixture in operative position.

With reference to FIGS. 2 and 3, the service operator may remove and replace the bulb 24 by hand through the access opening as shown in FIG. 2. The bulb is mounted in a threaded socket 26 welded or otherwise suitably secured to the carriage 28 which is in the form of a piston or plunger with upper and lower flanges 30, **30*a* closely adjacent the interior wall of the cylindrical tubing. The lower flanges 30*a* has suitably secured thereto a gasket 32 in sliding friction sealing contact with the interior wall of the tubing. Upon replacement or other servicing of the signal fixture 24, the door 22 is closed to seal the tube and a preferably gaseous fluid, e.g., air, under pressure from a suitable source (not shown) is flowed through conduit 34 to the lower portion of the tubing 16 beneath the carriage flange 30*a*. For this purpose, the conduit 34 may have a suitable quick connect and disconnect coupling to valve $V_1$ housing 36 for an open-closed type of valve manipulated at this time by handle means 36*a* to open position. Also at this time, an open-closed type of exhaust valve $V_2$ in housing 38 is closed by handle means 38*a***.

Figure 4:
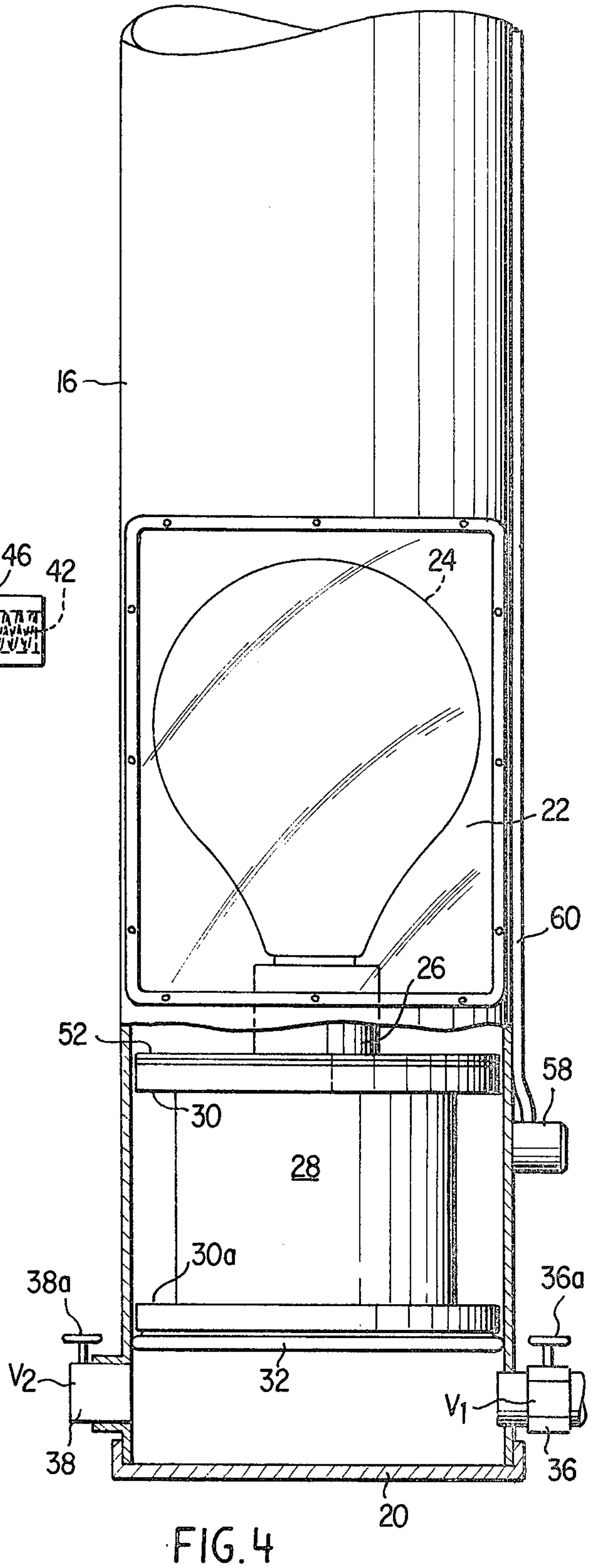
FIG. 4 is a similar view, partly in section, of the lower portion of the tubing arrangement with the carriage and fixture in the lower position for access.

Ingress of fluid under pressure will act on the carriage 28 through its gasket 32 seal with the tubing 16 until it reaches the upper position shown in FIG. 4 to which reference is now made. In this elevated position of the carriage and included light fixture, the carriage flange 30, or other abutment, will engage a stop 40 interiorly at the upper end of the tubing, and a spring 42 pressed plunger 44 of solenoid 46 will have been urged outwardly by the carriage flange 30, or other abutment, passing by the beveled edge thereof and will then be spring urged into the position of FIG. 3 underlying the carriage flange 30, or other abutment, to latchingly hold the carriage and included fixture in the uppermost signaling position. Then, either automatically by interlock, or by hand, valve $V_1$ will be closed and the fluid pressure source disconnected.

In arriving at this upper position of the carriage, trapped air in the tube will vent through opening 48 which may be louvered for protection against weather conditions. Suitable electrical connections are provided from a wired power source 50 to the bulb and socket and include a switch mechanism with resilient contacts 52, 54 insulatedly extending through the tubing. Each contact will resiliently engage a conductive (copper) ring 53, 55, respectively, arranged concentrically on an insulating surface 57 on the top surface of the piston, if made of metal. However, the piston may be formed of a non-conductive material consistent with desired weight characteristics for efficient ascent and descent operation, in which case the insulating surface 57 is not required. Thus, the circuit to lamp 24 will be completed at the upper position of the carriage (FIG. 4) and both contacts are resilient to assure continuity of contact even though there may be some lost motion of the carriage flange 30 between the stop 40 and the plunger latch 44. The carriage may be guided within the tube for rectilinear movement therealong to insure switch contact but if there is some relative rotation between the carriage and the tubing during ascent, the contact rings will insure contact with a respective switch element 52, 54.

When it is necessary to service the light fixture, a key 56 (FIG. 2) may be manipulated in on-off switch 58 to energize solenoid 46 (through suitable wiring connections 60) to withdraw plunger 44 against the action of spring 42 and thus free the carriage flange 30 for descent to the lower accessible position (FIGS. 2 and 3). Initial descending movement of the carriage will break the contacts, 52, 54 and deactivate the light. The exhaust valve $V_2$ is selectively opened for this descending movement of the carriage and this movement is resisted by sliding friction of the carriage gasket 32 with the tubing and under abnormal conditions, the valve $V_1$ may be manipulated to admit fluid under pressure to control descent, if necessary. The operation will be apparent from the foregoing description and the tubing may be formed of suitable material, such as aluminum tubing in sections joined as illustrated by collars or the like to the horizontal tower elements or otherwise for stable support. For example, a tubing arrangement may serve as the sole support for the light fixture as well as an elevator, as in street or highway lighting, and similar installations.

While shown for illustrative purposes, it will be understood that variations in details and arrangement of parts may be made without departing from the scope of the invention as set forth in the appended claims.

What is claimed is:

1. In a composite assembly of an elevated tower or other elevated and stabilized structure carrying an energizable warning fixture, as a light or other signal, at the top portion thereof; the provision of an auxiliary assembly including a substantially sealed tubing arrangement along substantially the length of the elevated structure in supported association therewith, a carriage carrying the warning fixture and disposed within said tubing arrangement as a piston with a sliding friction fit therewith for movement along the length thereof from a lower accessible position permitting replacement, repair of other servicing of the fixture, to an elevated upper position with the fixture in operative location relative to the elevated structure, force applying means reactive with the carriage for moving the carriage and included fixture from the lower position to the upper position and with permissive selective lowering thereof to the lower position, and means for effecting connection of the warning fixture to a source of energization therefor for operation of the warning fixture at the upper operative position thereof.

2. In the assembly of claim 1, wherein the fixture is electrically energized and the connection means is operative at the upper position of the carriage for connecting the fixture to the source of electrical energization and is releasable for disconnecting the fixture from the source of energization upon descent of the carriage and fixture to the lower position for accessibility.

3. In the assembly of claim 2, wherein latching means is provided for holding the carriage and fixture in the upper position thereof with the connection means in operative position, said latching means being releasable for the permissive descent of the carriage and fixture and release of the connection means.

4. In a composite assembly of an elevated tower or other elevated and stabilized structure carrying an energizable warning fixture, as a light or other signal, at the top portion thereof; the provision of an auxiliary assembly including a substantially sealed tubing arrangement along substantially the length of the elevated structure in supported association therewith, a carriage carrying the warning fixture and disposed with the tubing arrangement for movement along the length thereof from a lower accessible position permitting replacement, repair or other servicing of the fixture, to an elevated upper position with the fixture in operative location relative to the elevated structure, said carriage having a sliding seal fit with the interior of the tubing arrangement, fluid pressure means for selective entry to the lower portion of the tubing arrangement for elevating the carriage and included fixture to the upper operative position thereof with permissive selective lowering thereof to the lower position, and means associated with the auxiliary assembly and the carriage for effecting connection of the warning fixture to a source of energization therefor at the upper operative position thereof.

5. In the assembly of claim 4, wherein latching means is provided for releasable engagement with the carriage for holding the same in the upper position, said latching means being releasable to permit descent of the carriage and fixture to the lower position for accessibility.

6. In the assembly of claim 5, wherein the warning fixture is electrically energized from a remote source and the connection means includes a switch associated with the carriage and fixture and closed to source in the said upper position and releasable upon descent of the carriage to the said lower position.

7. In the assembly of claim 6, wherein exhaust valve means is selectively operable for the permissive descent of the carriage and fixture to the said lower position thereof.

8. A signal light support and elevator assembly comprising a substantially sealed tubing arrangement for stabilized support, a carriage acting as a piston and carrying a light fixture and disposed within the tubing arrangement with a sliding seal fit with the interior wall thereof and movable therealong between an upper position at the top portion thereof and a lower accessible position permitting replacement, repair or other servicing of the fixture, means for admitting fluid under pressure to the lower portion of the tubing arrangement beneath the carriage for moving the carriage to the upper position, latch means cooperating between the tubing arrangement and the carriage for holding the carriage in the upper position and selectively releasable to permit descent of the carriage and included fixture to the lower accessible position, and switch means actuatable at the upper position of the carriage for energizing the light fixture, and said switch means being deactivated upon descent of the carriage toward the lower position thereof to condition the fixture for servicing without danger of electrical shock at the lower accessible position of the carriage and included fixture.

9. An assembly as claimed in claim 8, wherein there is provided selectively operable exhaust valve means at the lower end of the tubing arrangement permitting descent of the carriage to the lower position thereof with the sliding seal fit between the carriage and interior wall of the tubing arrangement resisting excessively rapid descent of the carriage.

* * * * *